Patented Feb. 22, 1949

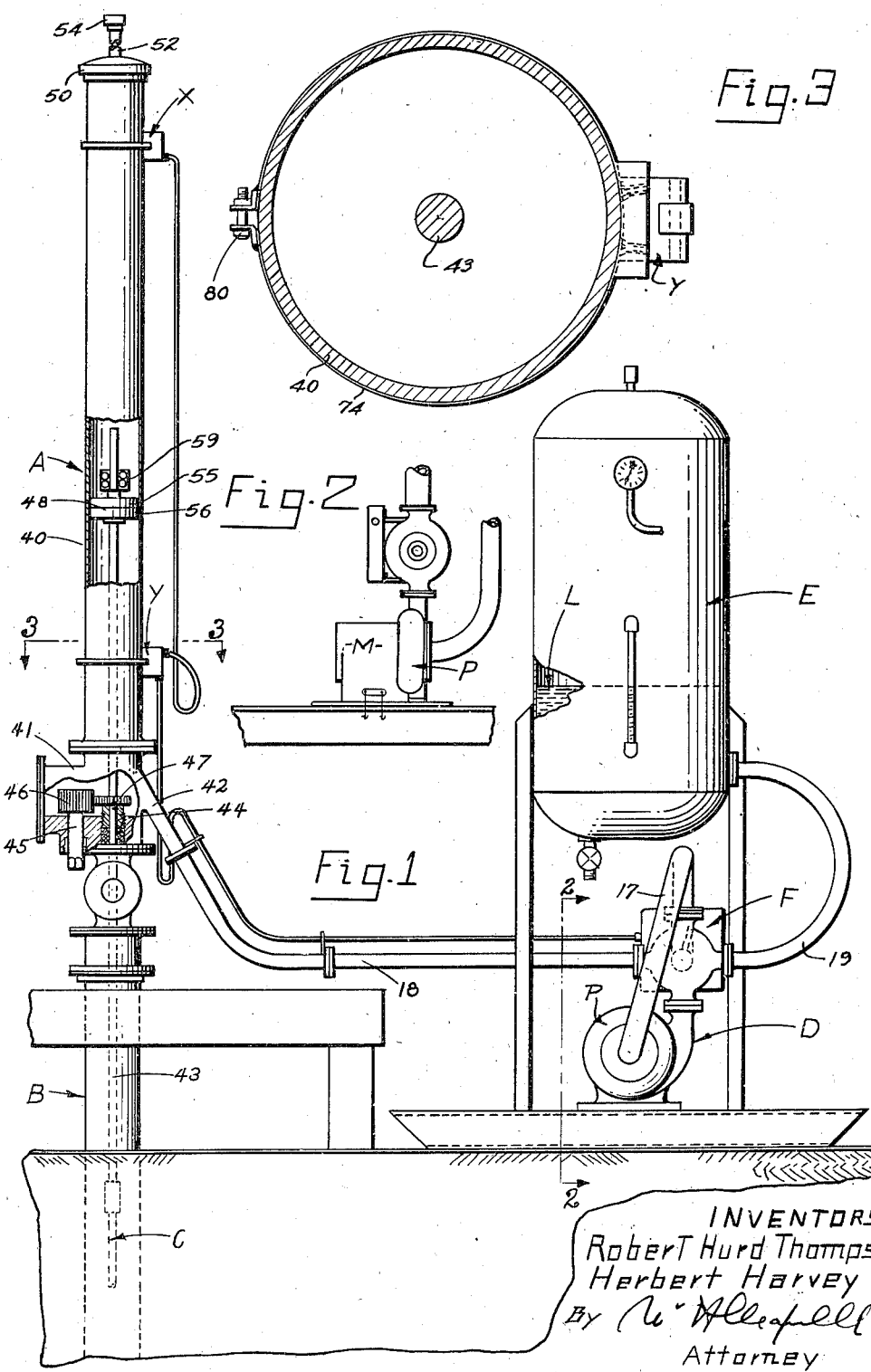

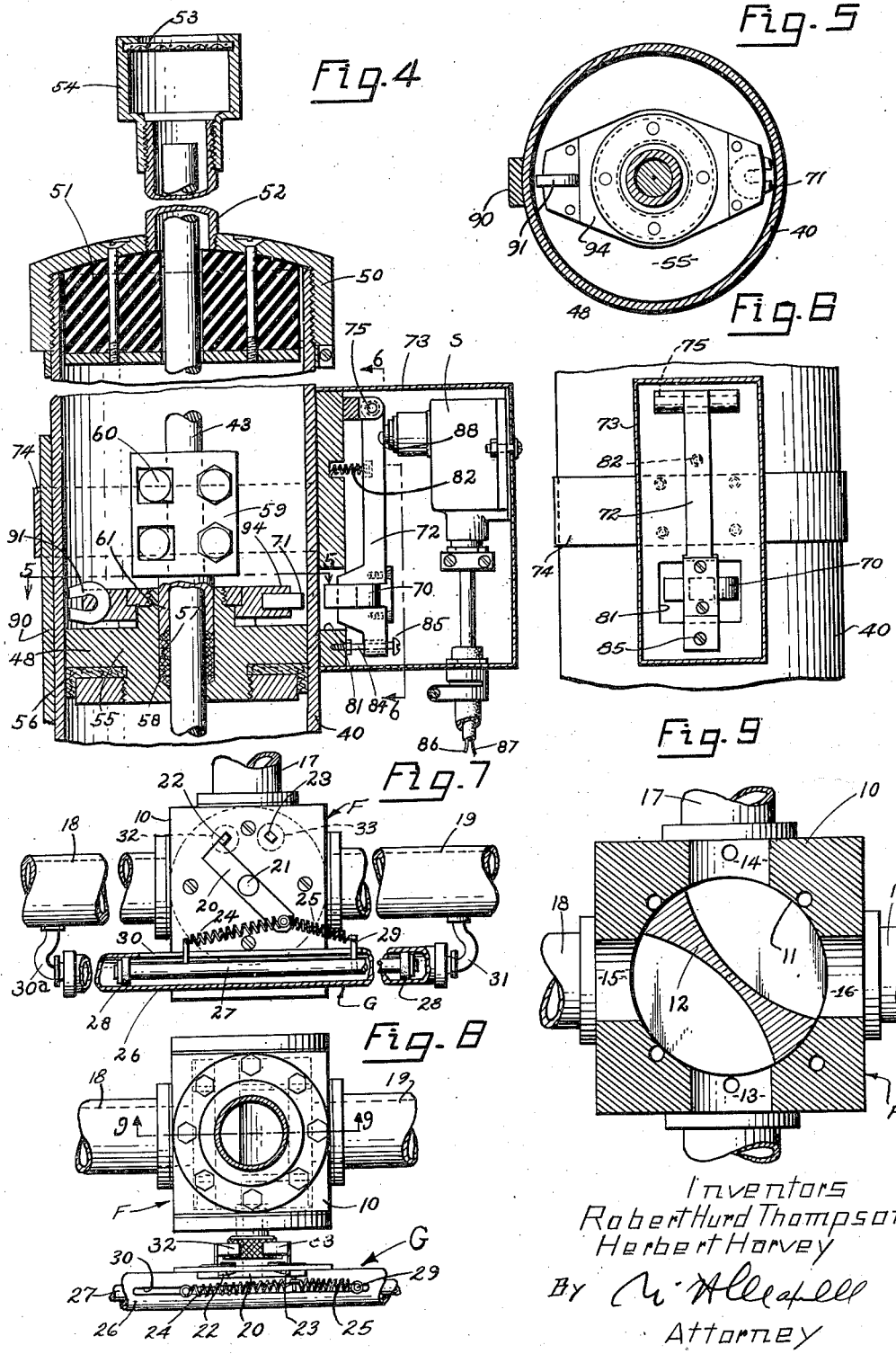

2,462,571

UNITED STATES PATENT OFFICE 2,462,571

MAGNETIC STROKE CONTROL FOR CYLINDER AND PISTON MECHANISMS

Robert Hurd Thompson and Herbert Harvey, Los Angeles, Calif., assignors to Leo M. Harvey, Los Angeles, Calif.

Application November 28, 1944, Serial No. 565,549

6 Claims. (Cl. 121—148)

This invention has to do with a stroke control for cylinder and piston mechanisms and it is a general object of the invention to provide a simple, dependable and fully adjustable magnetic stroke control for controlling or regulating the action of a piston, or the like.

Cylinder and piston or like mechanisms are used extensively for driving or operating various units or mechanisms. In many cases it is desirable to control or regulate the stroke of the piston in its cylinder and in some cases it is even important to vary the position of the piston in the cylinder, that is, the region of the cylinder throughout which the piston operates. For purpose of example we will refer to a cylinder and piston mechanism for operating a well pump through sucker rods, or the like.

In pumping a well, as for instance, an oil well, with the usual pumping equipment the pump located in the well is operated through a string of sucker rods and for best results the stroke given to the upper end of the string of sucker rods must be of the proper extent. Where a cylinder and piston mechanism is employed directly to operate a string of sucker rods it is desirable to be able to regulate the stroke of the piston in the cylinder and also to vary the zone of the cylinder throughout which the piston operates. For example it may be desired to vary the stroke by lengthening or shortening it at either or both ends of the movement, or it may be desired to vary the zone of movement of the piston in the cylinder in order to, in effect, bodily raise or lower the sucker rods.

It is a general object of our invention to provide a stroke control that is adjustable or subject to control without disturbing any part of the cylinder or piston or any part of the actuating means by which fluid is admitted to or exhausted from the cylinder. The control of the present invention is mechanically independent of the essential working parts of the cylinder and piston mechanism to the point that it can be adjusted or varied independent of such parts or without in any way manipulating or disturbing them.

Another object of this invention is to provide a stroke control which is mounted on or related to the cylinder and piston mechanism so that it is readily accessible so that it can be conveniently reached and can be easily and quickly adjusted at will.

Another object of the invention is to provide a stroke control of the general character hereinabove referred to free of delicate or complicated parts.

Another object of our invention is to provide a stroke control for a cylinder and piston mechanism utilizing magnetism as the medium or force to cause operation of a control element at the exterior of the mechanism when the piston reaches a predetermined position at the interior thereof.

The various objects and features of our invention will be fully understood from the following detailed description of a typical preferred form and application of the invention, throughout which description reference is made to the accompanying drawings, in which:

Fig. 1 is a general assembly view showing a well pump actuating apparatus or pump jack of the hydraulic type equipped with the stroke control of our present invention. Fig. 2 is a view taken substantially as indicated by line 2—2 on Fig. 1. Fig. 3 is an enlarged detailed transverse sectional view taken as indicated by line 3—3 on Fig. 1. Fig 4 is an enlarged detailed sectional view through a part of the pump jack showing elements of the control provided by the present invention. Fig. 5 is a detailed transverse sectional view through the cylinder of the pump jack being a view taken immediately above the piston on line 5—5 on Fig. 4. Fig. 6 is a view through the part of the mechanism provided by our invention being a view taken substantially as indicated by line 6—6 on Fig. 4. Fig. 7 is a face view or front elevation of the valve operating mechanism of the pump jack. Fig. 8 is a plain view of the valve operating mechanism of the pump jack and Fig. 9 is an enlarged transverse sectional view of the control valve of the pump jack, being a view taken substantially as indicated by line 9—9 in Fig. 8.

The control provided by our present invention is applicable, generally, to cylinder and piston mechanisms or the like, and since it can be used to advantage in connection with a hydraulic pump jack we have illustrated it in such connection, it being understood that such application is merely for purpose of example and is not to be construed as a limitation upon the invention.

The particular pump jack illustrated in the drawings is of the type or form which is more fully set forth and which is claimed in our copending application entitled "Apparatus for operating deep well pumps," Serial No. 565,548, filed on even date herewith.

The pump jack as shown in the drawings involves, generally, a cylinder and piston mechanism A mounted on the upper end of a well tubing head B to operate a string of pump operating rods or sucker rods C which project downwardly into the well through the tubing to operate a pump located at a suitable point in the well. In the particular pump jack shown for purpose of illustration there is a fluid pressure generating unit D involving a motor M and a centrifugal pump P. There is also a pressure accumulator E, a control valve F, an operating means or mechanism G for the control valve, and various fluid connections. The means D involves a motor such as an electric motor or the like, which continuously drives the pump P which is preferably a centrifugal pump. The accumulator E is a closed or pressure vessel carrying a suitable body of liquid L. The liquid in the accumulator is the actuating liquid.

The control valve may be of any suitable type to handle or direct the flow or circulation of fluid. In the case illustrated the valve has a body 10 with a bore 11 carrying a plug with a transverse web 12. Four passages 13, 14, 15 and 16 enter the body to communicate with the bore. The outlet or delivery of the pump P is connected to the passage 13 while the intake of the pump is connected with the passage 14 by a conduit 17. A conduit 18 connects the passage 15 with the lower end of the cylinder and piston mechanism while the conduit 19 connects the passage 16 with the lower portion of the accumulator. The plug of the valve is adapted to be operated through 90° between a position such as is shown in Fig. 9 where passages 13 and 15 are connected while passages 14 and 16 are connected, and a position where passages 13 and 16 are connected and passages 14 and 15 are connected.

The particular valve illustrated may be of the form and construction which is more fully set forth and claimed in our copending application entitled "Control valve," Serial No. 565,550, filed on even date herewith, now abandoned. The particular valve referred to is a balanced valve highly desirable for use in the apparatus being described.

The valve operating mechanism included in the pump jack illustrated includes, generally, a lever 20 on the stem 21 of the valve, latches 22 and 23 to catch and hold the lever in positions where the plug of the valve is positioned as above described, springs 24 and 25 for operating the lever, and power means for tensioning the springs. In the particular case illustrated the power means for tensioning the springs involves a cylinder 26, a rod 27 arranged in the cylinder with a piston 28 on either end, posts 29 projecting from the rod through a slot 30 in the cylinder to carry the ends of the springs 24 and 25, and fluid connections 30ᵃ and 31 between the ends of the cylinder 26 and the fluid conduits 18 and 19, respectively.

An electromagnet 32 is arranged to control or is operable to release the latch 22 while an electromagnet 33 is arranged to control or is operable to actuate and release the latch 23.

In the mechanism just described differential or drop in pressure between the conduits 18 and 19, which changes or alternates with change in position of the plug of the valve, is utilized to alternately tension the springs which serve to quickly operate or actuate the valve when the latches are released. When the lever 20 is held by one latch, as for instance by the latch 22 the spring 24 is tensioned and the lever is not operated to the other position or to be held by the latch 23 until the latch 22 is released. When the lever 20 is held by the latch 23 the spring 25 is tensioned and the lever is not moved to position to be held by the latch 22 until the latch 23 is released. The valve operating mechanism that I have just referred to, generally, is more fully described and is claimed in our copending application entitled "Valve operating mechanism," Serial No. 565,551, filed on even date herewith.

The cylinder and piston mechanism to be controlled by the device of the present invention may vary widely in form and character. In the particular case illustrated the mechanism involves a stationary cylinder having a body 40 of non-magnetic material, such as brass, or the like, mounted on the upper end of the well casing B through a head 41. The head is in the nature of a fitting which mounts the body of the cylinder on the well and it includes a fluid connection 42 for connecting with the conduit 18 from the valve F. The rod 43 of the mechanism enters the cylinder through the head 41 and may be a polish rod such as is usually used in well pumping equipment. In the case illustrated a packing gland 44 is provided in the head 41 around the rod and means is provided for tightening the gland as wear occurs. The means illustrated includes a shaft 45 entering the head to operate gears 46 and 47. The gear 46 is on the shaft 45 and the gear 47 is on the follower of the packing gland.

In the particular mechanism illustrated the piston 48 provided to operate in the body 40 is forced upwardly by fluid under pressure introduced into the lower end of the cylinder and is adapted to be moved downwardly by the weight of the rods or the pump, that is, it is moved by gravity in one direction and by fluid pressure in the other direction. With this particular form of mechanism the upper end of the cylinder 40 may be open. We have shown a cap 50 provided on the upper end of the cylinder to carry a bumper 51 of rubber, or the like, and we have shown a tubular extension 52 on the cap to house the upper end of the pump rod 43 should the parts be related and operated so that the pump rod projects through and beyond the cap. We have shown a screen 53 enclosing the upper end 54 of the tubular extension to prevent the entrance of foreign matter into the mechanism.

The piston 48 in the particular mechanism illustrated involves a body 55 slidably mounted on the rod 43, and a packing member 56 in the form of a cup leather carried at the under or lower side of the piston body to seal with the wall of the cylinder. The body of the piston is counterbored at 57 from its upper end to carry a body of packing 58. A clamp 59 is set on the rod 43 by clamp bolts 60, or the like, and has a downwardly projecting extension 61 which enters the counterbore in the piston to act as a follower for compressing the packing. Through the construction just described the clamp 59 can be set in any desired position along the pump rod 43 and the fluid acting on the under side of the piston always maintains the piston up against the clamp. It will be apparent that this construction provides a very simple means for adjusting the position of the piston along the rod.

The control of the present invention is provided to regulate or determine the stroke of the piston in the cylinder. In the particular pump jack hereinabove referred to the reversal of flow of fluid to the cylinder is under control of the valve F and the operating means for the valve F is controlled by the latches 22 and 23 of the operating mechanism G which latches are released upon energization of the electromagnets 32 and 33. Since the valve operating mechanism is controlled through flow of electricity to the electromagnets we provide a form of our invention which serves to control such flow or in other words which controls the circuits to the electromagnets 32 and 33.

The control of the present invention involves, generally, two units X and Y located at opposite end portions of the cylinder, each unit involving a magnetic element 70 to cooperate with a magnetic element 71 carried by the piston which operates in the cylinder. Each unit further involves an arm 72 carried in a housing 73 supported on the cylinder by a mounting band 74 and a switch S to be operated by the arm 72. The arm 72 is pivotally supported on a pivot pin 75 and carries the magnetic element 70. The housing 73 which encases the magnet element 70, the arm 72 and the switch S is preferably a tight or completely closed housing carried by the band 74 so that it can be moved to various positions along the cylinder. The band 74 is a split band provided with a clamp bolt 80 that can be operated to set the band in any desired position along the cylinder.

The arm 72 is pivotally supported at one end by the pivot pin 75 while its other or outer end carries the magnetic element 70. The inner wall of the housing has an opening 81 which accommodates the element 70 so that it can closely approach the outer wall of the cylinder. A spring 82 is arranged between a part of the housing and the arm 72 to normally yieldingly hold the arm out or away from the cylinder and a stop is provided for limiting such outward movement. The stop comprises a post 84 projecting from a part of the housing through an opening in the arm, the post being provided at its outer end with a stop head 85, as clearly shown in Fig. 4 of the drawings. The switch S is preferably of the enclosed type supported in the housing 73 to control flow through lines 86 and 87 which connect with opposite poles of one of the electromagnets hereinabove described. The switch S has an operating part or button 88 engaged by the arm 72 so that the switch is under control of the arm or so that the switch is operated by movement of the arm. In the particular case illustrated the switch is such that when the button 88 thereof is depressed or pushed in, as when the arm 72 is in its out position, the circuit through the electrical conduits 86 and 87 is open, but when the arm 72 is moved in through the action of the magnetic element 70 the circuit through the switch is closed.

It is to be understood that each of the units X and Y may be the same, that is, each may be such as we have just described, and it will be apparent that the units can be adjusted to any desired positions along the cylinder.

Our invention further provides the magnetic element 71 on the movable element of the cylinder and piston to cooperate with or actuate the elements 70 of the units X and Y. In the preferred arrangement the element 71 is mounted directly on the piston 48 and is preferably mounted on the upper side of the piston, as shown in the drawings. The magnetic element 71 is carried by the piston so that its poles are close to the inner wall of the piston. In practice we may use any suitable magnetic elements, that is, they may be energized electrically or we may, as we have shown in the drawings, use permanent magnets requiring no energization from an outside source.

From the foregoing description it will be apparent that when the inner magnetic element 71, that is, the magnet on the movable element, comes opposite the magnetic element 70 of a unit at the exterior of the cylinder, the unit 70 being mounted on the shiftable arm 72 moves inward or toward the element 71. The cylinder 40 is made of a material that allows this magnetic action to occur. Such movement, as above described, causes actuation of the switch S.

From the foregoing description it will be apparent how the control provides for actuation of the switches S when the magnetic element 71 reaches the desired points lengthwise of the cylinder and how operation of the switches S control the entire mechanism through action of the electromagnets 32 and 33. The various parts are connected and related so that when the control valve is positioned to admit fluid under pressure to the under side of the piston 48 the piston moves up in the cylinder until the element 71 comes opposite the element 70 of the upper unit X. When this position is reached the switch S of the upper unit closes, energizing the electromagnet 32 releasing the lever 20 so that the position of the control valve is reversed. The flow in the system will then be reversed so that fluid is delivered by the pump to the accumulator instead of to the cylinder and fluid from the cylinder is passed through the pump. Under this condition the piston 48 will lower in the cylinder and will continue to lower until the element 71 comes opposite the element 70 of the lower unit Y, whereupon the element 70 of the lower unit is moved in closing the switch S of the lower unit so that electromagnet 33 is energized releasing latch 23. This results in reversal of the valve so that fluid is again admitted to the cylinder to move the piston upward therein.

We provide means for maintaining the magnetic element 71 on the movable element of the mechanism in proper alignment with the magnetic elements 70 of the units X and Y. In the preferred arrangement we provide an elongate bar 90 of magnetic material, such as a bar of iron, on the exterior of the cylinder and we provide a magnet 91 on the movable element, for instance on the piston 48, to cooperate with the bar 90. There is a magnetic attraction established between the bar 90 and the element 91 resisting rotation of the piston in the cylinder and the parts are related so that when the magnetic element 91 is opposite the bar, as shown in the drawings, the element 71 is in position to properly cooperate with the element 70.

In practice it is common to employ a rod turner in connection with the sucker rods of a well pump to gradually turn the rods as the pump operates. As a result of this practice the rod 43 would be positively turned and the piston 48 would turn therewith. The piston, as above described, is slidable and rotatable on the rod and, therefore, the means provided for holding the element 71 in the proper rotative position may be of such character as to maintain the piston in the desired rotative position so that the rod turns relative to it. There may, in practice, be considerable friction between the rod 43 and the piston, in which case the magnetic elements 71 and 91 may be mounted as I have shown in the drawings. In the drawings we show a rotatable carrier 94 mounted on the upper side of the piston to carry the elements 71 and 91. The carrier can rotate free of the piston eliminating all danger of the rod 43 causing rotation of the magnetic elements out of the desired position.

From the foregoing description it will be apparent that we have provided a control means that will govern the stroke of a piston in a cylinder without the use of the usual stops or valve operating mechanisms commonly found in mechanisms of this character. By our invention we can effect the desired adjustment of the stroke of the piston by simply sliding the units X and Y along the exterior of the cylinder. Further it will be apparent that each unit is extremely simple in construction and involves but one essential moving element, namely the pivoted arm 72. In practice the mounting of the arm can be very simple and the general arrangement and construction of all of the parts can be simple, inexpensive and such that the mechanism is extremely dependable.

It is to be understood that under the broader aspects of our invention there is an element at one side of a wall, such as a cylinder wall, sensitive or responsive to a part, element, or device, that moves at the other side of the wall, or cylinder, and the wall, or cylinder, is such, at least in the region or zone of the first mentioned element, that it allows one element to influence or act upon the other when the elements are within a predetermined range of each other. The wall, or cylinder, at such region or zone is of such character that it does not dampen or insulate the elements from one another but rather allows one element to act on or influence the other. The specific example of our invention above set forth involves magnetic elements inside and outside of a cylinder. However, in using the terms "magnet" and "magnetic element" we do not mean to limit or restrict ourselves to parts, elements, or devices answering specifically to the ordinary or commonly accepted definition of the word "magnet" or to parts or devices that necessarily have magnetic action, but mean to include elements, parts, or devices possessed of magnetic force or of a character to influence a magnet or to disturb a magnetic field, and also parts, elements, or devices radiating or otherwise giving off or receiving or responsive to rays or fields such as rays or fields of vibratory action or any physical activity analogous to fields of magnetic force. Likewise, we refer, for example, to a cylinder and piston mechanism, whereas broadly, when we use the term "cylinder" we mean to include broadly any wall analogous to a cylinder wall which mechanically separates parts at its two sides.

Having described only a typical preferred form and application of our invention we do not wish to be limited or restricted to the specific details herein set forth, but wish to reserve to ourselves any variations or modifications that may appear to those skilled in the art and fall within the scope of the following claims.

Having described our invention, we claim:

1. In combination, a cylinder, a movable element operable in the cylinder and including a piston, and a control operable by the said element including a magnet at the exterior of the cylinder, a magnet in the cylinder and carried by said element, and a carrier for the magnet in the cylinder and rotatably connected with the piston, one of the magnets being movable and being adapted to move when the two magnets are opposite each other.

2. In combination, a cylinder, a movable element operable in the cylinder and including a piston, and a control operable by the said element including a magnet at the exterior of the cylinder, a magnet in the cylinder and carried by said element, a carrier for the magnet in the cylinder and rotatably supported by said element, and means holding the carrier in a predetermined rotative position in the cylinder so the magnets are in the same rotative position relative to the cylinder, one of the magnets being movable and being adapted to move when the two magnets are opposite each other.

3. In combination, a cylinder, a movable element operable in the cylinder and including a piston, and a control operable by the said element including a magnet at the exterior of the cylinder, a magnet in the cylinder and carried by said element, a carrier for the magnet in the cylinder and rotatably supported by said element, and electro-magnetic means holding the carrier in a predetermined rotative position in the cylinder so the magnets are in the same rotative position relative to the cylinder, one of the magnets being influenced by the other when the two magnets are in a predetermined position relative to each other.

4. In combination, a cylinder, a piston movable in the cylinder, and a control including a switch, a magnet in the cylinder and movable with the piston, and a magnet at the exterior of the cylinder, one of the magnets being movable to control the switch and being adapted to move when the magnets are opposite each other so magnetic force flows between them, and means mounting the second named magnet on the exterior of the cylinder for adjustment thereon including a band engaged around the cylinder to move thereon, means for clamping the band on the cylinder, and a housing carried by the band and carrying the magnet.

5. In combination, a cylinder, a piston movable in the cylinder, and a control including a magnet in the cylinder movable with the piston, a switch at the exterior of the cylinder, an arm mounted to move and operate the switch, a housing mounted on the exterior of the cylinder and carrying the switch and the arm, and a second magnet carried by the arm to be moved by the magnetic action of the first mentioned magnet.

6. In combination, a cylinder, a piston movable in the cylinder, and a control including a magnet in the cylinder movable with the piston, a switch at the exterior of the cylinder, an arm mounted to move and operate the switch, a housing at the exterior of the cylinder carrying the arm and switch, a band clamped around the cylinder and supporting the housing, and a second magnet carried by the arm to be moved by the magnetic action of the first mentioned magnet.

ROBERT HURD THOMPSON.
HERBERT HARVEY.

REFERENCES CITED

The following references are of record in the file of this patent:

UNITED STATES PATENTS

| Number | Name | Date |
|---|---|---|
| 694,547 | Hood | Mar. 4, 1902 |
| 1,527,678 | Farquhar | Feb. 24, 1925 |
| 1,876,044 | Davis | Sept. 6, 1932 |
| 2,196,522 | Davis | Apr. 9, 1940 |
| 2,231,158 | Davis | Feb. 11, 1941 |
| 2,260,127 | Tebbetts | Oct. 21, 1941 |
| 2,292,648 | Moore | Aug. 11, 1942 |